(12) United States Patent
Muller

(10) Patent No.: US 6,901,917 B2
(45) Date of Patent: Jun. 7, 2005

(54) DEVICE FOR SAVING FUEL AND REDUCING EMISSIONS

(75) Inventor: Jeffrey Alan Muller, Carrara (AU)

(73) Assignee: Save The World Air, Inc., Agoura Hills, CA (US)

( * ) Notice: Subject to any disclaimer, the term of this patent is extended or adjusted under 35 U.S.C. 154(b) by 0 days.

(21) Appl. No.: 10/275,946

(22) PCT Filed: May 21, 2001

(86) PCT No.: PCT/AU01/00585

§ 371 (c)(1),
(2), (4) Date: May 28, 2003

(87) PCT Pub. No.: WO01/90562

PCT Pub. Date: Nov. 29, 2001

(65) Prior Publication Data

US 2003/0183207 A1 Oct. 2, 2003

(51) Int. Cl.[7] .............................................. F02M 27/04
(52) U.S. Cl. ...................................................... 123/536
(58) Field of Search ............................... 123/536–539, 123/590; 60/272–324; 210/22, 695

(56) References Cited

U.S. PATENT DOCUMENTS

| 3,762,135 | A | * | 10/1973 | Ikebe et al. ....................... 96/1 |
| 3,893,437 | A | * | 7/1975 | Ries et al. .................... 123/537 |
| 4,372,852 | A | | 2/1983 | Kovacs |
| 4,414,951 | A | | 11/1983 | Saneto |
| 4,424,786 | A | | 1/1984 | Imbert |
| 4,460,516 | A | * | 7/1984 | Kapitanov et al. .............. 261/1 |
| 4,461,262 | A | * | 7/1984 | Chow .......................... 123/536 |
| 4,538,582 | A | | 9/1985 | Wakuta |
| 4,568,901 | A | | 2/1986 | Adam |
| 4,956,084 | A | | 9/1990 | Stevens |
| 4,995,425 | A | | 2/1991 | Weisenbarger et al. |
| 5,059,743 | A | | 10/1991 | Sakuma |
| 5,129,382 | A | * | 7/1992 | Stamps et al. ............... 123/536 |
| 5,161,512 | A | | 11/1992 | Adam et al. |
| 5,320,751 | A | * | 6/1994 | Burns .......................... 210/222 |
| 5,331,807 | A | * | 7/1994 | Hricak ......................... 60/275 |
| 5,536,401 | A | * | 7/1996 | Burns .......................... 210/222 |
| 5,558,765 | A | | 9/1996 | Twardzik |
| 5,664,546 | A | | 9/1997 | De La Torre Barreiro |
| 5,671,719 | A | | 9/1997 | Jeong |
| 5,673,674 | A | | 10/1997 | Monteiro Vieira |
| 5,716,520 | A | * | 2/1998 | Mason ......................... 210/222 |
| 5,816,227 | A | | 10/1998 | Cronk |
| 5,992,398 | A | * | 11/1999 | Ho ............................... 123/538 |
| 6,000,382 | A | * | 12/1999 | Albisetti ...................... 123/538 |
| 6,024,073 | A | | 2/2000 | Butt |
| 6,056,872 | A | | 5/2000 | Glass |
| 6,158,421 | A | * | 12/2000 | Hsieh et al. ................. 123/538 |
| 6,178,953 | B1 | * | 1/2001 | Cox ............................ 123/536 |
| 6,220,231 | B1 | | 4/2001 | Kobayashi |
| 6,386,187 | B1 | * | 5/2002 | Phykitt ........................ 123/538 |

FOREIGN PATENT DOCUMENTS

| DE | 299 13 059 U 1 | 3/2000 |
| EP | 0 852 291 A1 | 7/1998 |
| RU | N2146015 C1 | 2/2000 |
| RU | N2168052 C2 | 4/2003 |
| WO | WO/ 93/22553 | 4/1993 |
| WO | 99/23381 | 5/1999 |
| WO | 00/31404 | 6/2000 |

* cited by examiner

Primary Examiner—Marguerite McMahon
(74) Attorney, Agent, or Firm—Hoffman, Wasson & Gitler, P.C.

(57) ABSTRACT

A fuel saving device including a support which mounts a plurality of magnets in opposed polarities is provided in a number of embodiments which enables the device to be interposed in the fuel system of combustion engines with resulting fuel savings and a reduction in emissions.

23 Claims, 5 Drawing Sheets

DEVICE FOR SAVING FUEL AND REDUCING EMISSIONS

TECHNICAL FIELD

This invention relates to a device for saving fuel in combustion engines and reducing emissions, e.g. gaseous emissions to the atmosphere.

BACKGROUND ART

This invention relates particularly but not exclusively to a device for saving fuel and reducing emissions for use on internal combustion engines, e.g., normally aspirated engines and engines with fuel injectors. It will therefore be convenient to describe the invention with reference to these example applications.

However, it is to be clearly understood that the invention is capable of broader application.

For example, the invention can be applied to any combustion engine and not just motor vehicle engines.

Incomplete combustion of liquid fuels increases the cost of running engines. Further unburned fuel e.g. hydrocarbons are vented to the atmosphere through the exhaust and are generally harmful to the atmosphere.

Some of the gases emitted into the atmosphere include carbon monoxide, various nitrogen oxides, and unburned hydrocarbons.

Naturally therefore any device which acted to decrease fuel consumption and thereby lower the running costs of a vehicle as well as lowering the pollution released to the atmosphere would be a major advance in the art and would be most advantageous to society generally.

DISCLOSURE OF INVENTION

According to one aspect of this invention there is provided a fuel saving device including magnetic means for applying a magnetic force to a mixture of fuel droplets in air which is used to energise an engine prior to its introduction to the engine, the magnetic means being located intermediate fuel/air mixing means and a manifold leading to the engine.

Thus the magnet means applies a force to the droplets causing the droplets to be reduced in size which in turn leads to more complete combustion and less pollution.

Large droplets above a predetermined size tend to be susceptible to incomplete combustion.

Typically the engine to which this engine is applied is a normally aspirated engine, e.g. a petrol internal combustion engine, and the device is located between the carburettor and a common inlet manifold leading to the cylinders.

Alternatively, the engine may have fuel injection with the device being positioned upstream of the fuel injectors.

In one form the device may be associated with a fuel rail. In another form, the device may be positioned intermediate the fuel rail and the injectors.

The device may include a support, e.g. a spacer, defining a passage for the fuel air mixture which is coupled in series with the rest of the fuel line.

Typically, the magnetic means comprises a plurality of magnets, e.g. permanent magnets mounted on the support.

In a preferred form, there are an even number of magnets mounted on the support with the poles of the magnets reversed relative to each other.

Preferably the device has at least four magnets with the poles of adjacent magnets being reversed relative to each other.

In a preferred form, the N/S axis of the magnets is arranged broadly in the direction of the fuel/air passageway through the device, i.e. the axis is longitudinally arranged.

However, it is to be borne in mind that in some embodiments the N/S axis of the magnet may be transverse to the fuel/air passageway through the support.

Preferably, the magnets may be spaced apart from each other around the circumference of the fuel/air passageway.

However, it should also be borne in mind that the magnets may be axially spaced apart from each other, e.g. in the direction of the fuel/air passageway.

Advantageously, the magnets are powerful magnets, e.g. rare earth magnets.

Preferably the magnets are neodymium iron boron magnets and even more preferably specific grades of these magnets.

In a most preferred form an N-30 grade magnet supplied by A MAGNETIC FORCE based in Warriewood in New South Wales, Australia is used.

The rare earth magnets described above produce high strength magnetic fields. This enhances the magnetic force which is applied to the fuel droplets as they pass through the device. This enhances the breaking up or size reduction of the droplets as they pass through the device.

While neodymium iron boron magnets are particularly preferred, applicant believes that other magnets may also be used although they will not produce as effective a result, e.g. AlNiCo magnets.

Naturally, the size of the magnets will influence the strength of the magnetic field generated in the fuel air passageway. In one particular form, each magnet has a cross sectional surface area in the range of 20–50 mm×20–50 mm. This will suffice to produce a suitable magnetic field in a fuel air passageway having a diameter of 22 mm to 40 mm, preferably about 25 mm or 38 mm. The depth or thickness of the magnet will typically be 10–30 mm, the actual depth being influenced by the thickness of the spacer in which the magnet is received. It will be appreciated however that the size of the magnets can vary.

According to another aspect of the present invention there is provided fuel saving device comprising a support body having a centralised opening herein, a plurality of radially spaced magnets associated with the body and disposed about the circumference of the opening and in an arrangement which provides a continuous magnetic field across the opening.

The support body can be disc-like and is provided with a plurality of apertures therein to facilitate the fixture of the body in a fuel/air line leading to a combustion chamber of an internal combustion engine line.

Suitably the support body can be provided with top and bottom cover plates which secure the magnets against displacement via top and bottom surfaces of the support body.

The magnets can be secured to the support body by key slots of a complementary shape.

An even number of magnets can be provided with the poles of the magnets reversed relative to each other.

The device can have four magnets spaced substantially equidistantly about the circumference of a circular opening in the support body, arranged at approximately 90° apart from each other.

The device can include six magnets spaced substantially equidistantly about the circumference of a substantially oval shaped opening in the support body.

According to a further aspect of the present invention there is provided a fuel saving system for an internal combustion engine comprising a single or double throat carburetor and a fuel saving device as aforesaid positioned between the carburetor ad an inlet to a combustion chamber of the engine.

According to a still further aspect of the present invention there is provided a fuel system for an internal combustion engine comprising a single or double throat carburetor and a fuel saving device as aforesaid positioned between the carburetor and a common inlet to the combustion chamber of an engine.

According to a still further aspect of the present invention there is provided a fuel system for a combustion engine comprising a single or multiport fuel injection system and at least one fuel saving device as aforesaid positioned between the fuel injection fuel rail and the injectors.

According to a still further aspect of the present invention there is provided a fuel system for a combustion engine including a fuel saving device as aforesaid mounted at an inlet to the combustion chamber(s) of the engine.

A fuel saving and emission reducing device in accordance with this invention may manifest itself in a variety of forms. It will be convenient to hereinafter describe in detail several preferred embodiments of the invention with reference to the accompanying drawings. The purpose of providing this detailed description is to enable persons having an interest in the subject matter of the invention how to carry the invention into practical effect. It is to be clearly understood that the specific nature of this description does not supercede the generality of the preceding statements.

Figure 1:
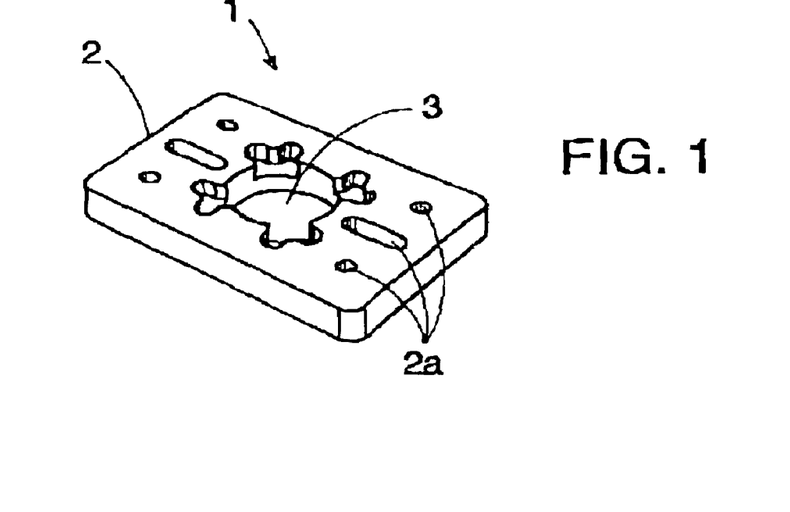
FIG. 1 is a three dimensional view of a device in accordance with a first embodiment of the invention.
Figure 2:
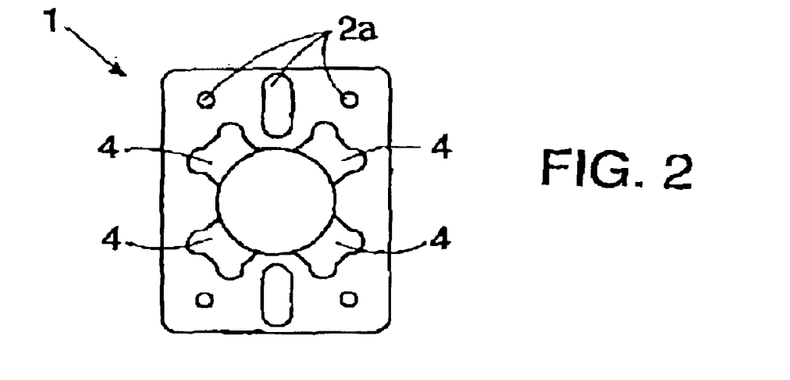
FIG. 2 is a plan view of the device of FIG. 1.
Figure 3:
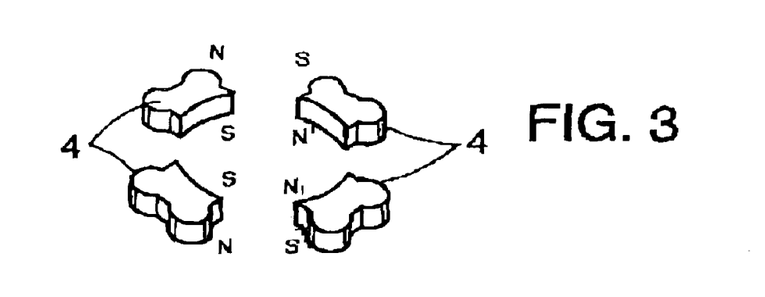
FIG. 3 is a schematic drawing showing the North-South orientation of the magnets in the device of FIG. 1.

In FIGS. 1 to 3 reference numeral 1 refers generally to a fuel saving and emission control device in accordance with the invention.

Broadly, the device 1 comprises a support 2 in the form of a flattened rectangular block defining a fuel/air passageway 3 therethrough.

A plurality of permanent magnets 4 are arranged around the circumference of the passageway 3

FIG. 1 shows recesses or apertures without magnets fitted or inserted for clarity.

Each magnet is a neodymium iron boron magnet. These are recently developed high power permanent magnets.

The specifications of these magnets are available from the Australian based supplier mentioned earlier.

The arrangement of the North-South Poles of the magnets 4 are shown in FIG. 3.

The polar axes are arranged generally in the direction of the air/fuel passageway.

Adjacent magnets have opposed N-S orientations as shown in the drawings.

In use the support 2 is coupled in line with the carburettor and common inlet manifold of an internal combustion engine such that the fuel air mixture passes through the passageway 3 therein.

This exposes fuel droplets passing from the carburettor to the manifold to the magnetic field of the magnets causing the droplets to reduce in size.

This leads to more complete combustion when the fuel enters the cylinder causing lower fuel consumption and less exhaust gas pollution.

Without being bound by theory, applicant believes that the magnetic forces applied to the fuel droplets by the magnetic fields of the various magnets act to substantially reduce the size of the droplets.

The applicant believes that the strong magnetic fields break down the size of the droplets and that the droplets may be reduced in size to as low as 3 micron diameter.

As a result, the fuel droplets have a substantially greater surface area in contact with the air and the subsequent combustion reaction in the cylinder is more complete and more efficient.

It is closer to a complete burn where all the hydrocarbons react with oxygen.

Experiments conducted by the applicant show that the device does reduce substantially the number of large droplets of fuel passing into the cylinder.

Experiments have also shown that the use of the device leads to reduced fuel consumption.

Experiments also show that some forms of the device substantially reduce CO, $CO_2$ and $NO_x$ emission levels.

While the fuel consumption savings have been emphasised the reduction in emissions are also significant and important.

The applicant has achieved fuel savings of up to 63% with a preferred device according to the invention on a four cylinder petrol engine.

Figure 4:
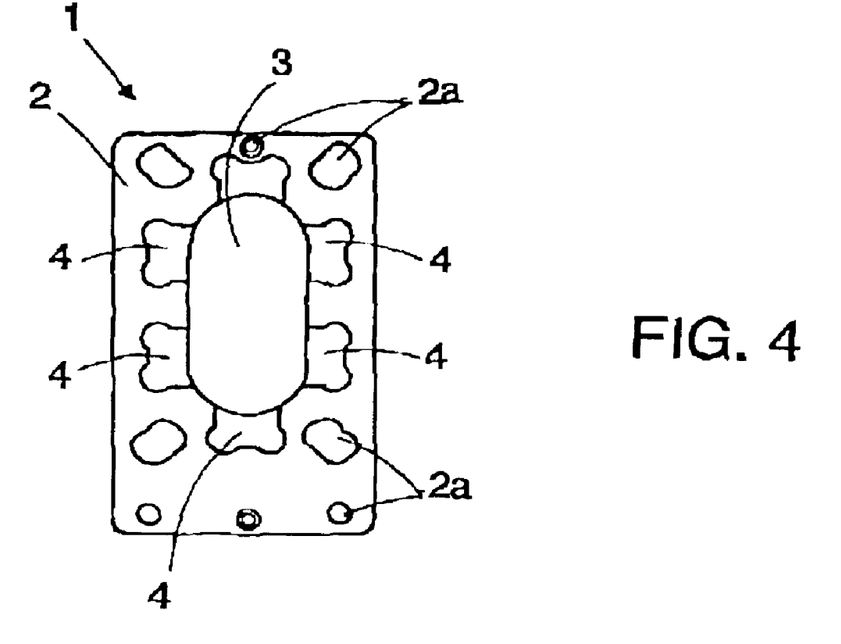
FIG. 4 shows a plan view of a device in accordance with a second embodiment of the invention.

FIG. 4 illustrates a device in accordance with a second possible embodiment of the present invention.

The device is structurally and functionally very similar to that in FIG. 3 and unless otherwise indicated the same reference numerals are used to refer to the same components.

The device is used on a vehicle with a twin throat carburetor. This explains why it has an elongate oval passage of substantially greater cross sectional surface area than the FIG. 1 embodiment.

Another structural difference between this device and the FIG. 1 device is the six magnets arranged around the circumference of the passageway.

This provides a magnetic field across the larger cross sectional surface area of the passageway comparable to that of the four magnets of the FIG. 1 device.

Figure 5:
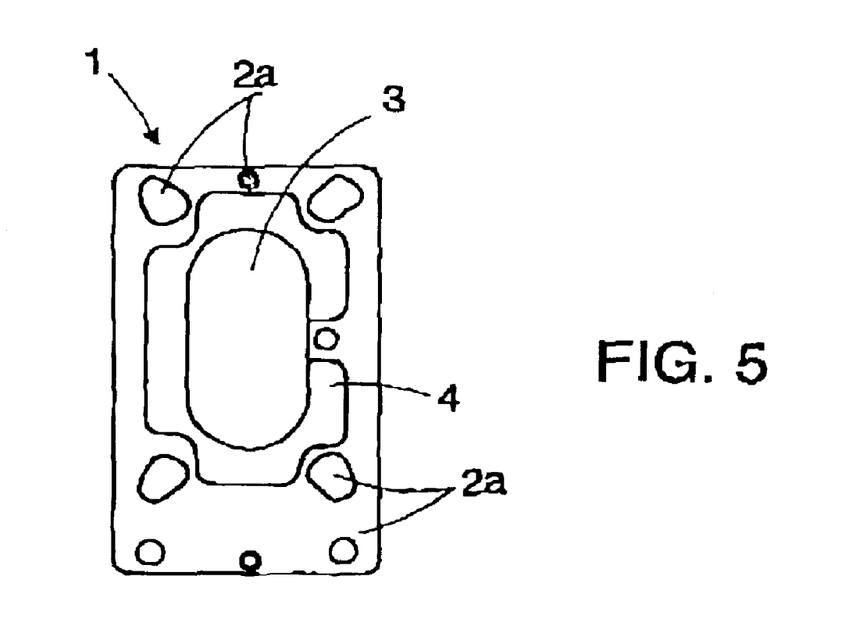
FIG. 5 is a plan view of a device in accordance with yet another embodiment of the invention.

FIG. 5 illustrates a device in accordance with yet another embodiment of the invention.

In this arrangement the magnets 4 are (which may be layered) are of substantially C-shaped configuration.

In the case of the devices illustrated by FIGS. 1 to 5 fixture apertures 2a of various shapes and in various positions can be provided in the supports 2.

Top and bottom cover plates (not shown) can be provided to secure the magnets against displacement via the top and bottom surfaces of the body 2.

Figure 6:
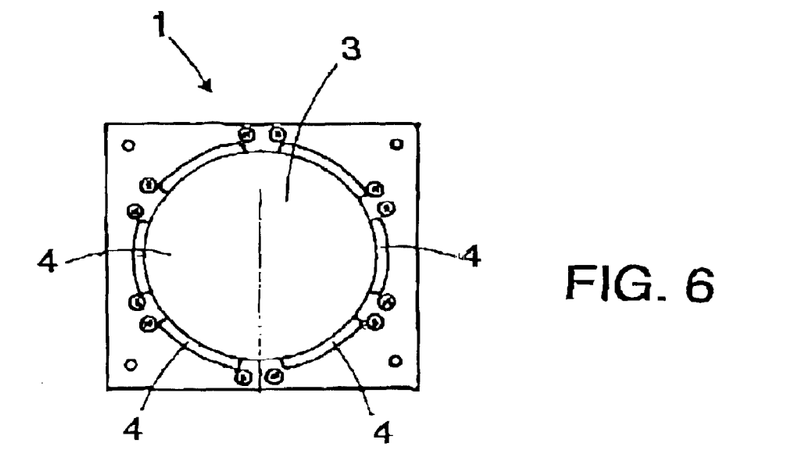
FIG. 6 is a plan view of a device in accordance with yet another embodiment of the invention.

FIG. 6 illustrates a device in accordance with yet another embodiment of the invention. This device has some fundamental structural differences over the previously described embodiments.

Specifically, the magnets 4 are arranged with their North-South axes transverse to the fuel/air passageway 3. In the previous embodiments the North-South axes were parallel to the fuel air passageway. In essence a plurality of magnets 4 are arranged head to toe around the circumference of the passageway with small spacings between adjacent magnets.

In the illustrated device there are six magnets 4 spaced apart around the circumference of the support 1.

The poles of adjacent magnets are opposed, i.e. the North Pole of one magnet is adjacent the South Pole of the adjacent magnet.

This pattern is continued around the circumference of the flow passage 3.

While six magnets have been shown in this embodiment this precis number is not critical.

Another feature of this embodiment is that there is only a single layer of magnets 4 in the fuel air passageway.

Figure 7:
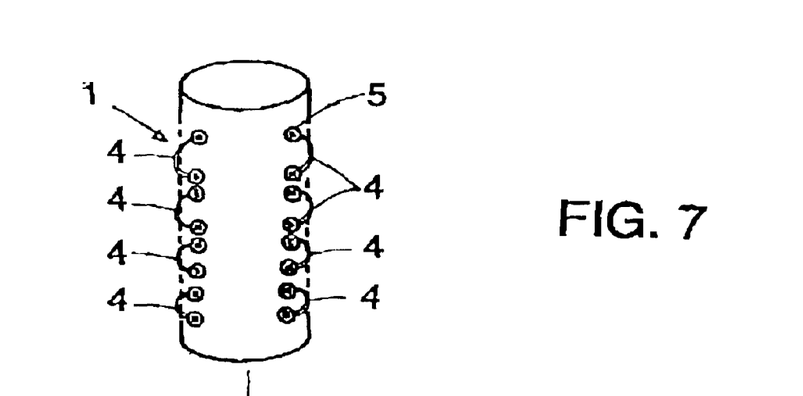
FIG. 7 is a three dimensional view of a device in accordance with yet another embodiment of the invention.

FIG. 7 illustrates yet another embodiment similar to the embodiment in FIG. 6.

The crucial difference between the FIG. 6 and the FIG. 7 embodiment is that it has a plurality of layers of magnets 4 which are longitudinally spaced from each other.

Each layer comprises a plurality of magnets, e.g. two magnets 4, arranged relative to each other as with the previous embodiment.

The magnets are received within a sleeve 5, e.g. of copper, aluminum steel or other material having slots 6 defined therein. The sleeve 5 is then passed into a housing (not shown) which is mounted inline with a fuel line.

The housing typically has flanged ends (not shown) for attaching it to the adjacent components. The sleeves 5 and magnet 4 are sized to be received within the housing with a small clearance.

Figure 8:
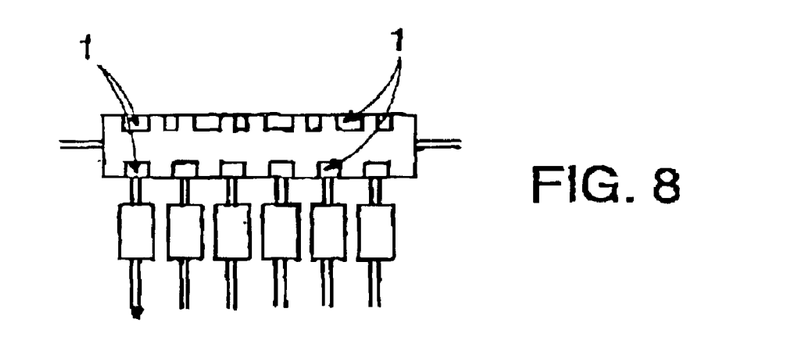
FIG. 8 is a schematic plan view of a device in accordance with another embodiment of the invention.
Figure 9:
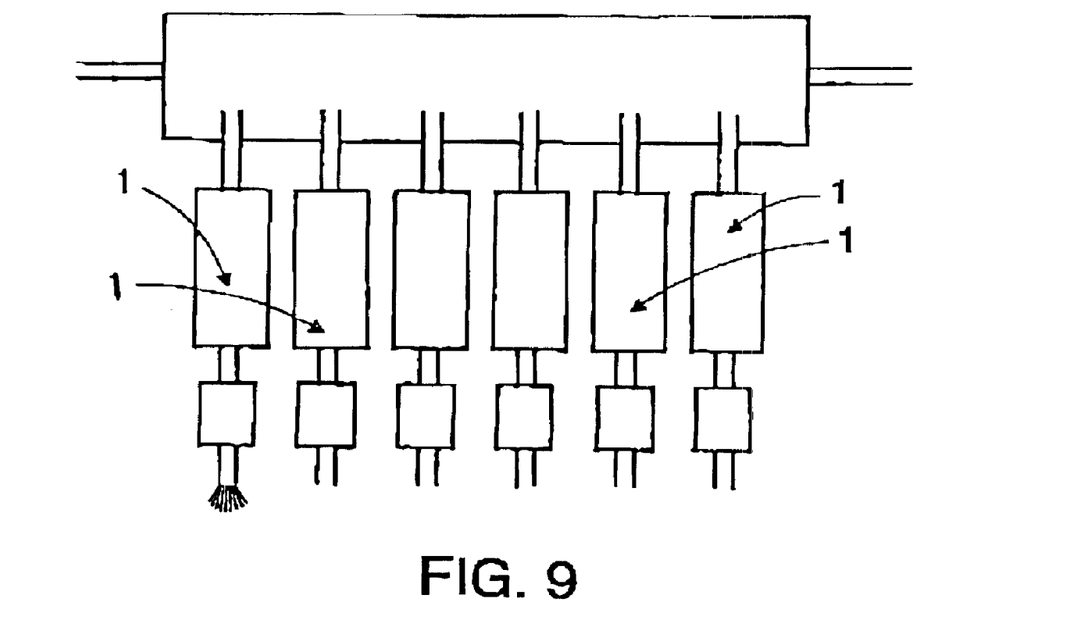
FIG. 9 is a schematic plan view of a variation of the device of FIG. 10.
Figure 10:
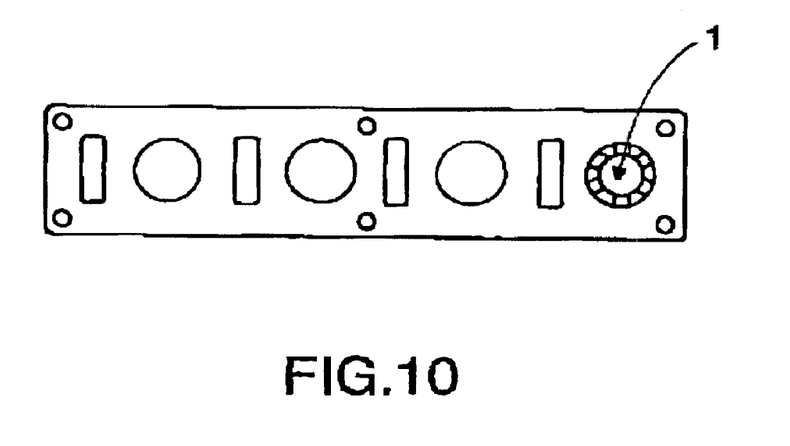
FIG. 10 is a schematic plan view of a device in accordance with yet another embodiment of the invention.

FIGS. 8 to 10 illustrate a fuel saving device for use on a fuel injection system as distinct from a carburetor system.

FIG. 8 illustrates a device mounted on a centre point injector system. More specifically, the device is fitted intermediate the fuel injection fuel rail and the injector.

A device will typically be installed for each injector.

The fuel saving device is only illustrated schematically in the drawings.

The structure and function thereof however is similar to that described above with reference to anyone of FIGS. 1 to 6.

FIG. 9 illustrates a device which is incorporated into the injector fuel rail.

The device comprises a plurality of magnets 4 spaced apart around the periphery of the fuel rail as shown in the drawings.

With this embodiment, a single device serves all injectors. By contrast with the FIG. 8 embodiment, there is a separate device for each injector.

FIG. 10 illustrates a fuel saving device which is mounted in the head, e.g. of the cylinder, adjacent the inlet.

The fuel saving device will be mounted in each of the cylinders to achieve the fuel saving and emission reduction effect therein.

While the illustrated device has six magnets, this number is not essential. It might equally have two or four magnets.

Where the device is fitted to a head the device may be fitted to a round or square support which receives square or round magnets, and the support may provide an internally threaded mounting for receiving and securing a fuel injector valve. Alternatively similar arrangements may be built into head cylinders when engines are manufactured.

Figures 11, 12, 13:
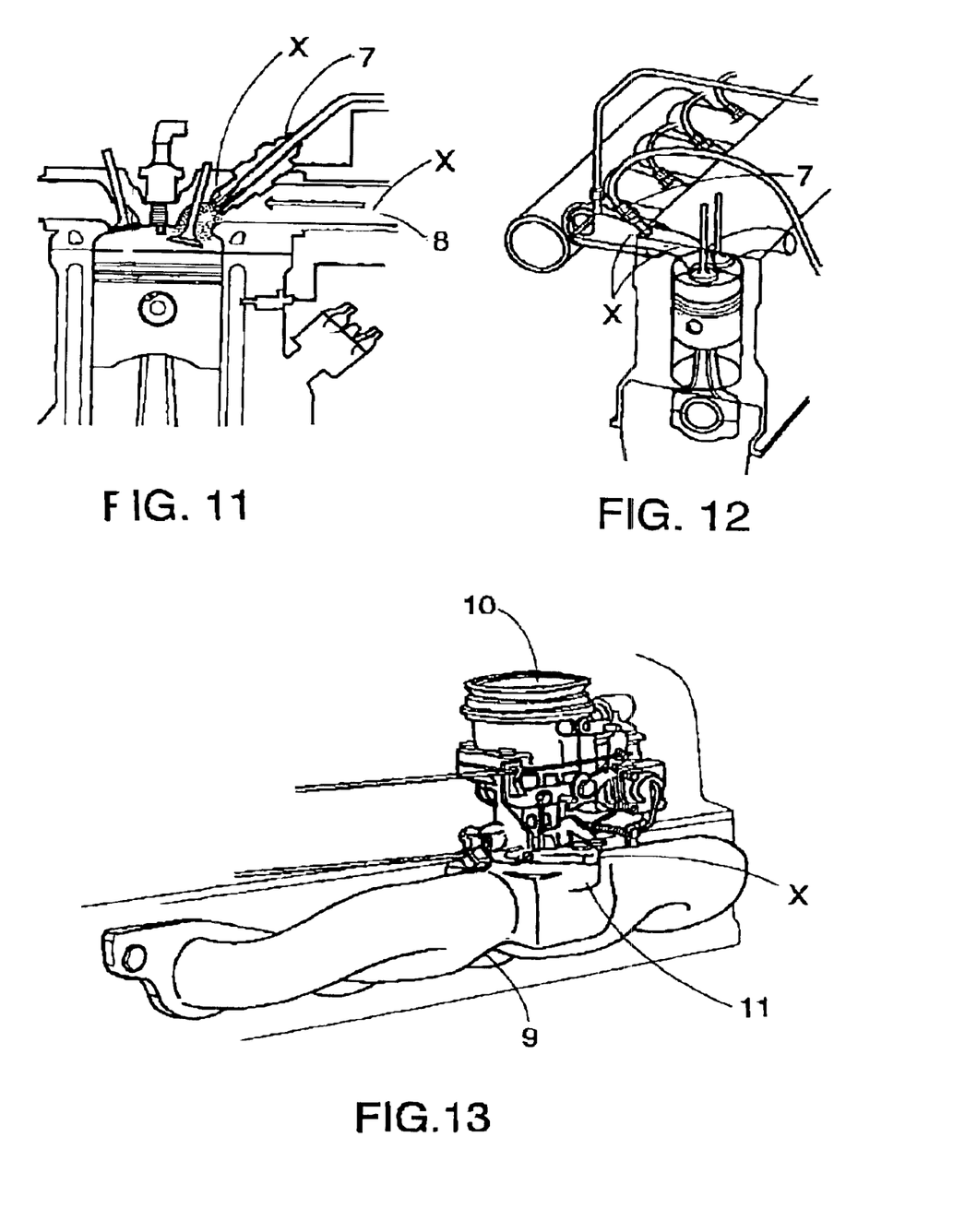
FIGS. 11 to 13 illustrate examples of installation sites for the device of the present invention in typical motor vehicle engine fuel systems.

FIGS. 11 to 13 of the drawings indicate specific installation sites for the device of the present invention.

In FIG. 11 in an electronic fuel system the device can be inserted in either of the positions "X" being at the opening to a combustion chamber adjacent an injector 7 and/or in the air line 8 preceding the injector 7.

In FIG. 12 a typical mechanical injection system the device can be positioned at sites "X" to either side of the injector 7.

In FIG. 13 being that of a typical inlet manifold 9 of a four-cylinder engine the device can be interposed at site "X" between the carburetor 10 and common inlet of the manifold 11.

Applicant has found its fuel saving and emission device to be highly effective.

A particular advantage of the device is that it is of relatively simple structure, can easily be manufactured, and can be retrofitted to existing motor vehicles.

The device is most effective on carburettor and centre-point injection systems, however it does have application to other systems such as fuel injection systems.

The device can be used on the exhaust of a diesel engine where it has been found to reduce exhaust emissions, e.g. including black smoke.

The following is a typical example of comparative emission levels from recent tests on combustion engines showing levels of emissions with an without a device of the present invention installed in a fuel system.

| LEVEL | | RPM | % |
|---|---|---|---|
| CO | | 840 | 1.2 |
| $CO_2$ | COLD ENGINE | 840 | 3.2 |
| $O_2$ | WITHOUT DEVICE FITTED | 840 | 13.8 |
| HC | | 840 | 200 PPM |
| CO | HOT ENGINE | 860 | 2.3 |
| $CO_2$ | WITHOUT DEVICE FITTED | 860 | 3 |
| $O_2$ | | 860 | 13.8 |
| HC | | 860 | 200 PPM |
| CO | | 780 | 0.1 |
| $CO_2$ | WARM ENGINE | 780 | 3.4 |
| $O_2$ | WITH DEVICE FITTED | 780 | 15 |
| HC | | 780 | 80 PPM |

-continued

| LEVEL | | RPM | % |
|---|---|---|---|
| CO | | 1440 | 0.1 |
| CO2 | | 1440 | 3.9 |
| O2 | | 1440 | 14 |
| HC | | 1440 | 40 PPM |
| CO | | 1430 | 01 |
| CO2 | | 1430 | 41 |
| O2 | | 1430 | 14 |
| HC | | 1430 | 20 PPM |
| CO | | 1410 | 0.1 |
| CO2 | | 1410 | 4 |
| O2 | | 1410 | 14 |
| HC | | 1410 | 20 PPM |
| CO | | 890 | 0 |
| CO2 | | 890 | 0.4 |
| O2 | | 890 | 20.1 |
| HC | | 890 | 60 PPM |
| CO | | 890 | 0 |
| CO2 | | 890 | 0.3 |
| O2 | | 890 | 20.2 |
| HC | | 890 | 60 PPM |
| CO | | 890 | 0 |
| CO2 | | 890 | 0.8 |
| O2 | | 890 | 20.3 |
| HC | | 890 | 40 PPM |
| CO | | 890 | 0 |
| CO2 | HOT ENGINE | 890 | 0 |
| O2 | WITH DEVICE FITTED | 890 | 20.5 |
| HC | | 890 | 20 PPM |
| CO | ENGINE STOPPED | 810 | 0 |
| CO2 | AND | 810 | 4.7 |
| O2 | RESTARTED | 810 | 12.3 |
| HC | | 810 | 140 PPM |

It will of course be realised that the above has been given by way of illustrative examples of the invention and that all such modifications and variations thereto as would be apparent to persons skilled in the art are deemed to fall within the broad scope and ambit of the invention as defined in the appended claims.

What is claimed is:

1. A method of improving the fuel economy and emission outputs of a combustion engine, the method including the step of
   i. interposing a fuel saving device within an air/fuel environment at or after an air/fuel mixing point of a fuel system for the engine characterized in that the fuel saving device comprises;
      a. a non-magnetic body having
         i. an opening therein having an axial dimension and a radial dimension and defining an air/fuel flow pathway,
         ii. the axial dimension of the opening co-axial with flow pathway within the air/fuel environment, and
      b. at least three magnets, each magnet having a polar axis oriented substantially parallel to the flow pathway, at least two said magnets being substantially opposed, the polar axis of the opposed magnets being in the same direction, with the at least third magnet's polar axes being in the opposite direction,
   the at least three magnets positioned to provide multiple overlapping and interacting fields of magnetic force, such that the air/fuel mixture is subjected to more than one magnetic field as it passes through the opening.

2. A method as claimed in claim 1 wherein the opening has a periphery and the magnets are keyed into the periphery, each have a magnetic face which extends to and is directly communicable with the opening.

3. A method as claimed in claim 1 wherein the body is provided with a plurality of apertures therein to facilitate the fixture of the body in a fuel/air line leading to a combustion chamber of an internal combustion engine.

4. A method as claimed in claim 1 wherein the body is provided with top and bottom cover plates which secure the magnets against displacement via top and bottom surfaces of the body.

5. A method as claimed in claim 1 wherein there are an even number of magnets with the poles of adjacent magnets reversed relative to each other.

6. A method as claimed in claim 1 wherein the device has four magnets spaced substantially equidistantly about the circumference of the opening in the body, arranged at approximately 90° apart from each other.

7. A method as claimed in claim 1 wherein the opening is a substantially oval shaped and the device includes six magnets spaced substantially equidistantly about the circumference of the opening in the body.

8. A fuel saving device comprising
   i. a non-magnetic body having
      a. an opening therein having an axial dimension and a radial dimension and defining an air/fuel flow pathway,
      b. the axial dimension of the opening co-axial with the flow pathway within an air/fuel environment, and
   ii. at least three magnets, each magnet having a polar axis oriented substantially parallel to the flow pathway, at least two said magnets being substantially opposed, the polar axis of the opposed magnets being in the same direction, with the at least third magnet's polar axes being in the opposite direction,
   the at least three magnets positioned to provide multiple overlapping and interacting fields of magnetic force, such that the air/fuel mixture is subjected to more than one magnetic field as it passes through the opening.

9. A fuel saving device as claimed in claim 8 wherein the opening has a periphery and the magnets are keyed into the periphery, each magnet having a magnetic face which extends to and is directly communicable with the opening.

10. A fuel saving device as claimed in claim 8 wherein the body is provided with a plurality of apertures therein to facilitate the fixture of the body in a fuel/air line leading to a combustion chamber of an internal combustion engine.

11. A fuel saving device as claimed in claim 8, wherein the body is provided with top and bottom cover plates which secure the magnets against displacement via top and bottom surfaces of the body.

12. A fuel saving device as claimed in claim 8, wherein there are an even number of magnets with the poles of adjacent magnets reversed relative to each other.

13. A fuel saving device as claimed in claim 8, wherein the device has four magnets spaced substantially equidistantly about the circumference of the opening in the body, arranged at approximately 90° apart from each other.

14. A fuel saving device as claimed in claim 8, wherein the opening is substantially oval shaped and the device includes six magnets spaced substantially equidistantly about the circumference of the opening in the body.

15. A fuel saving system for an internal combustion engine comprising a single or double throat carburetor and a fuel saving device as claimed in claim 1 positioned between the carburetor and an inlet to a combustion chamber of the engine.

16. A fuel system for an internal combustion engine comprising a single or double throat carburetor and a fuel saving device as claimed in claim 1 positioned between the carburetor and a common inlet to the combustion chamber of an engine.

17. A fuel system for a combustion engine comprising a single or multiport fuel injection system and at least one fuel saving device as claimed in claim 11 positioned between the fuel injection fuel rail and the injectors.

18. A fuel system for a combustion engine including a fuel saving device according to claim 1 mounted at the inlet of the combustion chamber(s) of the engine.

19. An emissions reducing installation comprising a device according to claim 1 associated with the exhaust system of a combustion engine.

20. A fuel system for a combustion engine including a fuel saving device according to claim 11 mounted at the inlet of the combustion chamber(s) of the engine.

21. A method according to claim 1 wherein the fuel saving device includes at least 4 magnets.

22. A method according to claim 1 wherein the passageway in the body is substantially circular.

23. A method according to claim 1 wherein the passageway in the body is substantially oval.

* * * * *